(12) United States Patent
Parthasarathi et al.

(10) Patent No.: US 11,694,497 B2
(45) Date of Patent: Jul. 4, 2023

(54) PROXIMITY DETECTION AND AUTHENTICATION METHOD AND SYSTEM

(71) Applicant: NXP B.V., Eindhoven (NL)

(72) Inventors: Srivathsa Masthi Parthasarathi, Bangalore (IN); Sunil Dilipkumar Jogi, Bangalore (IN); Ghiath Al-kadi, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/538,371

(22) Filed: Nov. 30, 2021

(65) Prior Publication Data

US 2022/0207940 A1    Jun. 30, 2022

(30) Foreign Application Priority Data

Dec. 31, 2020    (IN) .............................. 202011057466

(51) Int. Cl.
*G07C 9/10* (2020.01)
*G07C 9/22* (2020.01)

(52) U.S. Cl.
CPC ................. *G07C 9/10* (2020.01); *G07C 9/22* (2020.01)

(58) Field of Classification Search
CPC ............ G07C 9/10; G07C 9/22; G07B 15/02; H04W 4/021; H04W 12/08; G06Q 50/30; H01Q 21/29; H04B 17/318
See application file for complete search history.

(56) References Cited

U.S. PATENT DOCUMENTS

| 10,127,746 | B2 | 11/2018 | Bergdale et al. |
| 10,163,178 | B1 | 12/2018 | Sprogis et al. |
| 2009/0325593 | A1* | 12/2009 | Do ..................... H04M 1/72457 455/456.1 |
| 2016/0131750 | A1* | 5/2016 | Lu ........................... G01S 11/06 342/458 |
| 2018/0033226 | A1* | 2/2018 | Robertson ............... H04L 63/08 |
| 2019/0135229 | A1* | 5/2019 | Ledvina .................. H04W 4/40 |

FOREIGN PATENT DOCUMENTS

| CN | 111667608 A | 9/2020 |
| WO | 2018/227118 A1 | 12/2018 |

* cited by examiner

*Primary Examiner* — Vernal U Brown

(57) ABSTRACT

The method includes one or more turnstiles using a non-secure ranging process to detect a proximity of one or more mobile computing devices carried by respective users. The method also includes one of the turnstiles, on making a proximity determination in respect of a first of said mobile computing devices, commencing a secure authentication process to authenticate a user carrying the first mobile computing device. The method further includes, in response to a determination that the user carrying the first mobile computing device has been authenticated, allowing the user carrying the first mobile computing device to pass through the turnstile.

20 Claims, 3 Drawing Sheets

PROXIMITY DETECTION AND AUTHENTICATION METHOD AND SYSTEM

CROSS-REFERENCE TO RELATED APPLICATIONS

This application claims priority under 35 U.S.C. § 119 to India Patent Application No. 202011057466, filed on Dec. 31, 2020, the contents of which are incorporated by reference herein.

BACKGROUND

The present specification relates to a proximity detection and authentication method and system including one or more turnstiles.

Known Ultra-Wide Band (UWB) based infrastructure anchor devices may not be able to detect the intentions and/or the actions of the user to pass through a turnstile, or might require large number of anchors to determine the presence and intent of the user. This problem can lead to network capacity issues.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a proximity detection and authentication method including:

one or more turnstiles using a non-secure ranging process to detect a proximity of one or more mobile computing devices carried by respective users;

one of the turnstiles, on making a proximity determination in respect of a first of the mobile computing devices, commencing a secure authentication process to authenticate a user carrying the first mobile computing device; and in response to a determination that the user carrying the first mobile computing device has been authenticated, allowing the user carrying the first mobile computing device to pass through the turnstile.

According to another aspect of the present disclosure, there is provided a proximity detection and authentication system including one or more turnstiles operable to:

use a non-secure ranging process to detect a proximity of one or more mobile computing devices carried by respective users;

on making a proximity determination in respect of a first of the mobile computing devices, commence a secure authentication process to authenticate a user carrying the first mobile computing device; and in response to a determination that the user carrying the first mobile computing device has been authenticated, allow the user carrying the first mobile computing device to pass through the turnstile.

A system according to an embodiment this disclosure may allow the initiation of unnecessary secure authentication processes to be reduced a the turnstiles, especially in the presence of a large number of mobile computing devices. A system according to an embodiment this disclosure may also allow secure authentication processes to be commenced in a streamlined and timely manner, according to the proximity determination.

The proximity determination may be implemented in a number of ways. In one embodiment, making a proximity determination in respect of a first of the mobile computing devices includes determining that the first mobile computing device is within a threshold distance from the turnstile. In one embodiment, making a proximity determination in respect of a first of the mobile computing devices includes monitoring a range of the first mobile computing device from the turnstile over time and determining that the mobile computing device is moving toward the turnstile. It is envisaged that these approaches may be combined.

There may be a plurality of turnstiles. The method may further include: determining which one of the turnstiles the first mobile computing device is closest to; and the turnstile that the first mobile computing device is closest to: commencing the secure authentication process to authenticate the user carrying the first mobile computing device; and allowing the user carrying the first mobile computing device to pass through the turnstile that the first mobile computing device is closest to in response to the determination that the user carrying the first mobile computing device has been authenticated. This may allow the "correct" turnstile (e.g. the turnstile which the user intends to pass through) to perform the secure authentication process.

Determining which one of the turnstiles the first mobile computing device is closest to may be achieved by using an angle of arrival, "AoA", calculation based on AoA data included in one or more packets received from the first mobile computing device.

Determining which one of the turnstiles the first mobile computing device is closest to may be achieved by determining a distance of the mobile computing device from at least two turnstiles and using a triangulation calculation based on the distance of the mobile computing device from the at least two turnstiles and a distance between the least two turnstiles. This may obviate the need for the mobile computing device(s) to be capable of providing AoA data.

The proximity detection and authentication method may include commencing the secure authentication process to authenticate a user carrying the first mobile computing device based on:

the proximity determination; and a public ID included in one or more packets received from the first mobile computing device.

The proximity detection and authentication method may include:

checking a database of public IDs for the public ID included in the one or more packets received from the first mobile computing device; and commencing the secure authentication process in response to a determination that the public ID included in the one or more packets received from the first mobile computing device is present in the database of public IDs.

The database may thus include an "allowed list" of users/mobile computing devices which may, in principle, pass through the turnstile (subject to the secure authentication process).

The proximity detection and authentication method may include ceasing the non-secure ranging process between the turnstiles and the first mobile computing device on commencement of the secure authentication process to authenticate the user carrying the first mobile computing device. This may improve the bandwidth available for the non-secure ranging process.

The secure authentication process may use a session key to create a Security Token Service, "STS", session for the turnstile and the mobile computing device. The session key may be unique to the mobile computing device.

The non-secure ranging process may use ultra-wide-band, "UWB", communications.

The secure authentication process may use:
a near field communications, "NFC", communication process; or
an ultra-wide-band, "UWB", communication process.

According to a further aspect of the present disclosure, there is provided a computer program product including program instructions executable on a processor for performing the method set out in any of claims 1 to 12.

A computer program product according to an embodiment of this disclosure may, for instance, be stored on a carrier medium such as CD, DVD, Blu-Ray disc, memory stick, solid state memory or hard disk drive. The computer program product may be stored on an anchor of the kind described herein.

The proximity detection and authentication system may further include a database of public IDs. The system may be operable to commence the secure authentication process to authenticate a user carrying the first mobile computing device based on:
the proximity determination; and
comparison of a public ID included in one or more packets received from the first mobile computing device with the database of public IDs.

The database may thus include an "allowed list" of users/mobile computing devices which may, in principle, pass through the turnstile (subject to the secure authentication process).

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
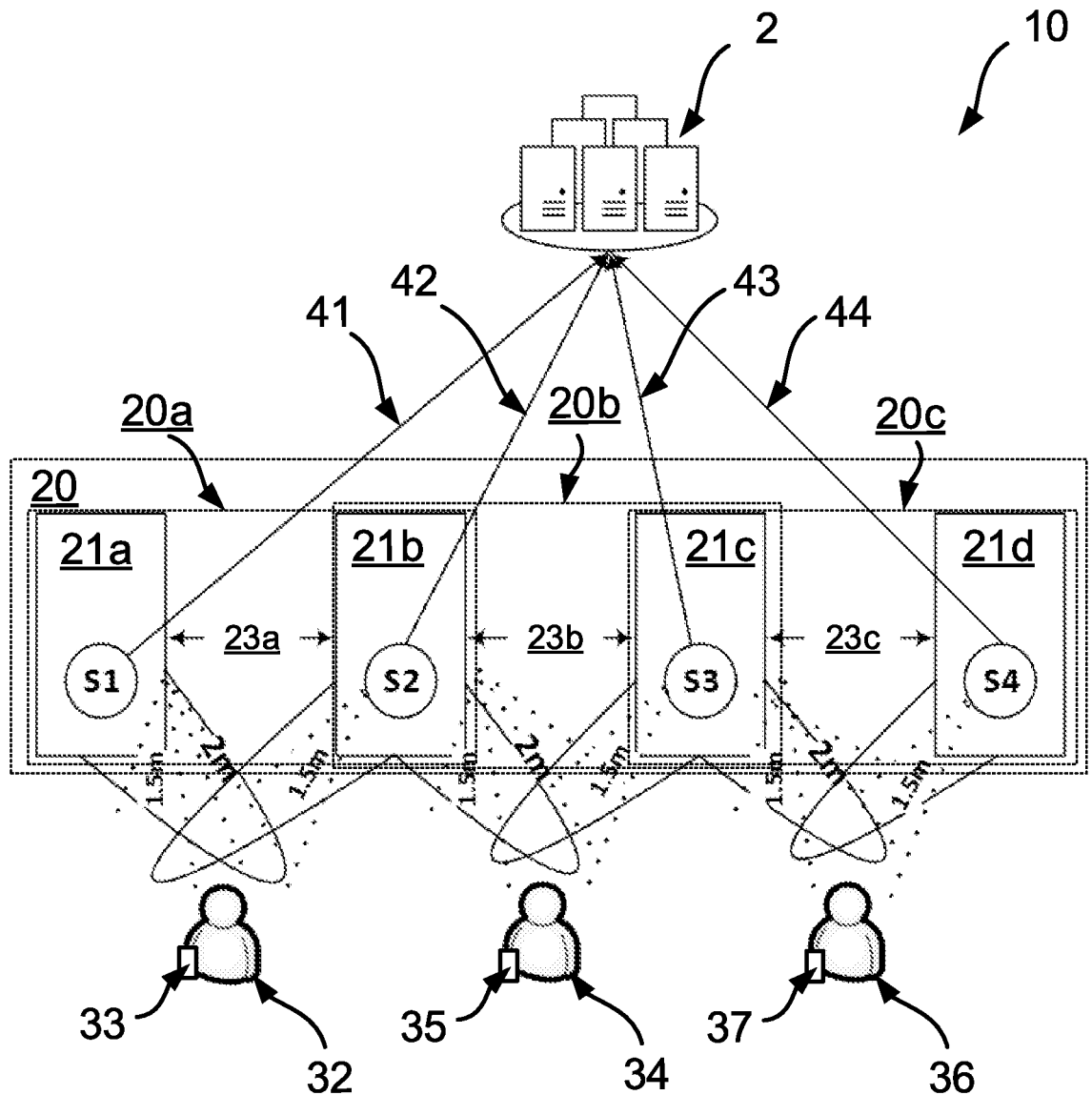
FIG. 1 shows a system including a plurality of turnstiles according to an embodiment of this disclosure.

FIG. 1 shows a system 10 including a plurality of turnstiles 20 according to an embodiment of this disclosure. For the purposes of this disclosure, a turnstile may be considered to comprise a barrier which is openable to allow a person through. In accordance with embodiments of this disclosure, the barrier may be opened subject to a secure authentication process.

The plurality of turnstiles 20 in FIG. 1 includes three turnstiles 20a, 20b, 20c. It is envisaged that there may be any number of turnstiles (e.g. a single turnstile, or a plurality (2, 3, 4, 5 . . . etc.) of turnstiles). Each turnstile may be formed from a pair of bases (e.g. bases 21a/21b, 21b/21c, 21c/21d), comprising pillars or the like. The bases 21 of each turnstile 20a, 20b, 20c may be separated from each other to define a walkway 23a, 23b, 23c through which a person may pass. A barrier may extend into the walkway 23a, 23b, 23c of each turnstile from one or both bases 21a/21b, 21b/21c, 21d/21d of that turnstile. The barrier(s) may block passage through the walkways 23, but may be moveable to allow passage through the walkway 23 once the aforementioned secure authentication process has determined that the person is permitted to pass through the turnstile.

Note that when a plurality of turnstiles 20 are arranged in a row as shown in FIG. 1, each turnstile 20a, 20b, 20c may share one of its bases 21 with a neighbouring turnstile. Accordingly, another way of viewing each turnstile is as being comprised of a single base 21 from which extends the moveable barrier. By placing these units, each comprising a base and barrier in a line, an arrangement of the kind shown in FIG. 1 may be formed. A further base (e.g. base 21d in FIG. 1) may be placed at the end of the row, to complete the walkway 23c of the turnstile 20c.

Each turnstile 20 may include components for performing a proximity detection and authentication method according to embodiments of this disclosure. These components may include an antenna for sending/receiving wireless messages to/from one or more mobile computing devices. The components may also comprise electronics for processing the signals sent/received between the turnstile and the mobile computing devices. The components may also include an interface (e.g. wired or wireless) for communicating with a remote server 2 (e.g. via wired or wireless links 41, 42, 43, 44). The aforementioned components may be provided within an anchor S1, S2, S2, S3. Each anchor may be mounted on or in a base 21 of the turnstile 20. As may be appreciated from FIG. 1, each turnstile 20 may share one of its anchors S with a neighbouring turnstile 20. On the other hand, if each turnstile 20 is considered to comprise a single base 21 as mentioned above, each turnstile 20 may be considered to comprise a single anchor S. Accordingly, each turnstile 20 may be considered to have one or more anchors S.

The mobile computing devices may typically be mobile telephones, but it is envisaged that the mobile computing devices may comprise any portable devices operable to send/receive wireless messages (e.g. a smart watch, tablet, laptop etc.).

FIG. 1 also shows a plurality of people 32, 34, 36. Each person 32, 34, 36 carries a respective mobile computing device 33, 35, 37 of the kind mentioned above. The people shown in FIG. 1 may (or may not) wish to pass through one of the turnstiles 20. While FIG. 1 shows one person 32, 34, 36 opposite each turnstile 20a, 20b, 20c, it will be appreciated that people in the vicinity of the turnstiles 20 may be located in a semi-random arrangement. For instance, the turnstiles 20 may be located in a concourse (e.g. at a railway station or in an airport), where people are present in the concourse, only some of whom intend to pass through the turnstiles 20 at some point. It is also envisaged that as people approach the turnstiles to pass through one of the turnstiles 20, queues may form in front of the walkways 23 formed by each turnstile 20. Given that not everyone in the vicinity of the turnstiles 20 may wish to pass through the turnstiles 20, and also given that only some of the people who wish to pass through the turnstiles 20 may approach the turnstiles 20 at any given time, in accordance with embodiments of this disclosure, the process of authenticating people located in the vicinity of the turnstiles 20 for allowing them to pass through the turnstiles 20 may be streamlined to avoid unnecessary attempts to authenticate people who do not intend through the turnstiles 20 at that time (or at all).

In accordance with embodiments of this disclosure, there may be provided a two stage proximity detection and authentication method, which may allow the turnstiles 20 to determine which people in the vicinity of the turnstiles 20 wish to pass through the turnstiles 20, and which may limit the performance of a secure authentication process (to determine whether a person is allowed to pass through the turnstiles 20) to people that were identified in the first stage.

The secure authentication process itself may, for instance, determine whether the person 32, 34, 36 carrying the mobile computing device 33, 35, 37 has a ticket (e.g. train or flight ticket) allowing them to proceed through the turnstile 20. In another example, the secure authentication process may involve some form of transaction (e.g. a financial transaction), such as payment from that persons bank account, to allow them to pass through the turnstile 20.

Figure 2:
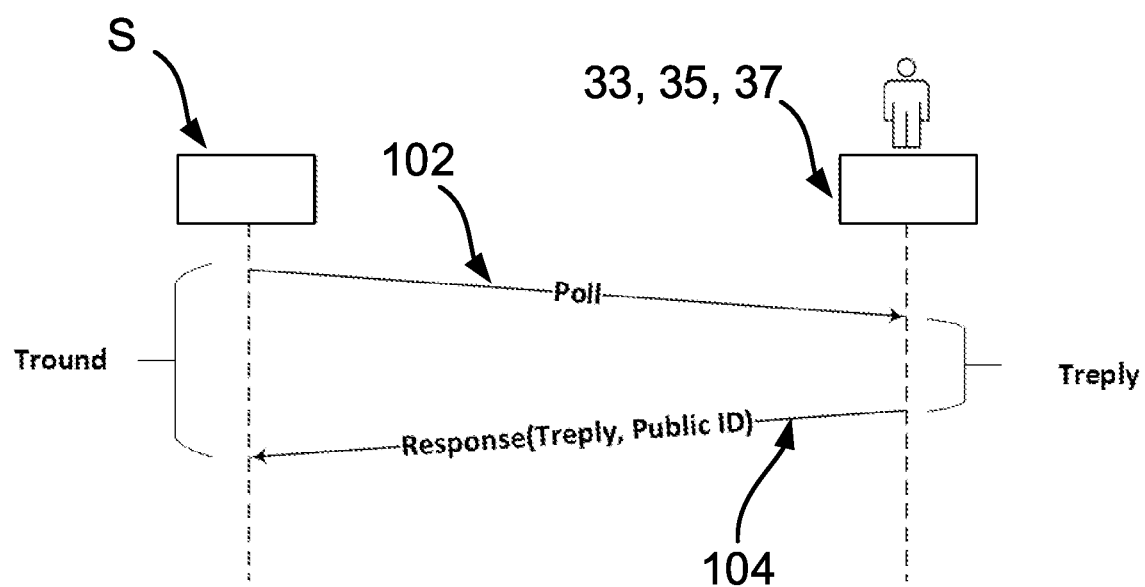
FIG. 2 shows a detection method according to an embodiment of this disclosure.

The first stage of a proximity detection and authentication method according to an embodiment of this disclosure is illustrated in FIG. 2. In this stage, one or more turnstiles 20 may use a non-secure ranging process to detect a proximity of one or more mobile computing devices 33, 35, 37 carried by respective users 32, 34, 36. As shown in FIG. 2, this may involve an anchor S of one of the turnstiles 20 transmitting packets 102 (e.g. on a broadcast basis) for polling mobile computing devices carried by people located in the vicinity of the turnstiles 20. These packets are received by one or more mobile computing devices. At least some of the mobile computing devices 33, 35, 37 may respond to these polling messages 102 with replies 104 comprising packets that may contain, an identifier (such as a public ID (e.g. key)) for identifying the mobile computing device. The packets in the replies 104 from the mobile computing devices 33, 35, 37 may also include a value Treply, which specifies the time taken between receipt of the polling message 102 at that mobile computing device and the transmission of that mobile computing device's reply 104. The anchor S may compare Treply with Tround, namely the time elapsed between the transmission of the polling message 102 and the receipt of the reply 104. This may allow the anchor to determine the distance (D) between the anchor S and the mobile computing device according to $D=c*((Tround-Treply)/2)$, where c is the speed of light. Ranging can, in some embodiments, be implemented using double-sided Two-Way Ranging (DS-TWR) processes.

The non-secure ranging process in this first stage may take place using any non-secure wireless communication technology which supports the transmission and receipt of polling messages 102 and replies 104 of the kind noted above. One suitable technology comprises the use of ultra-wide-band, "UWB", communications.

Figure 3:
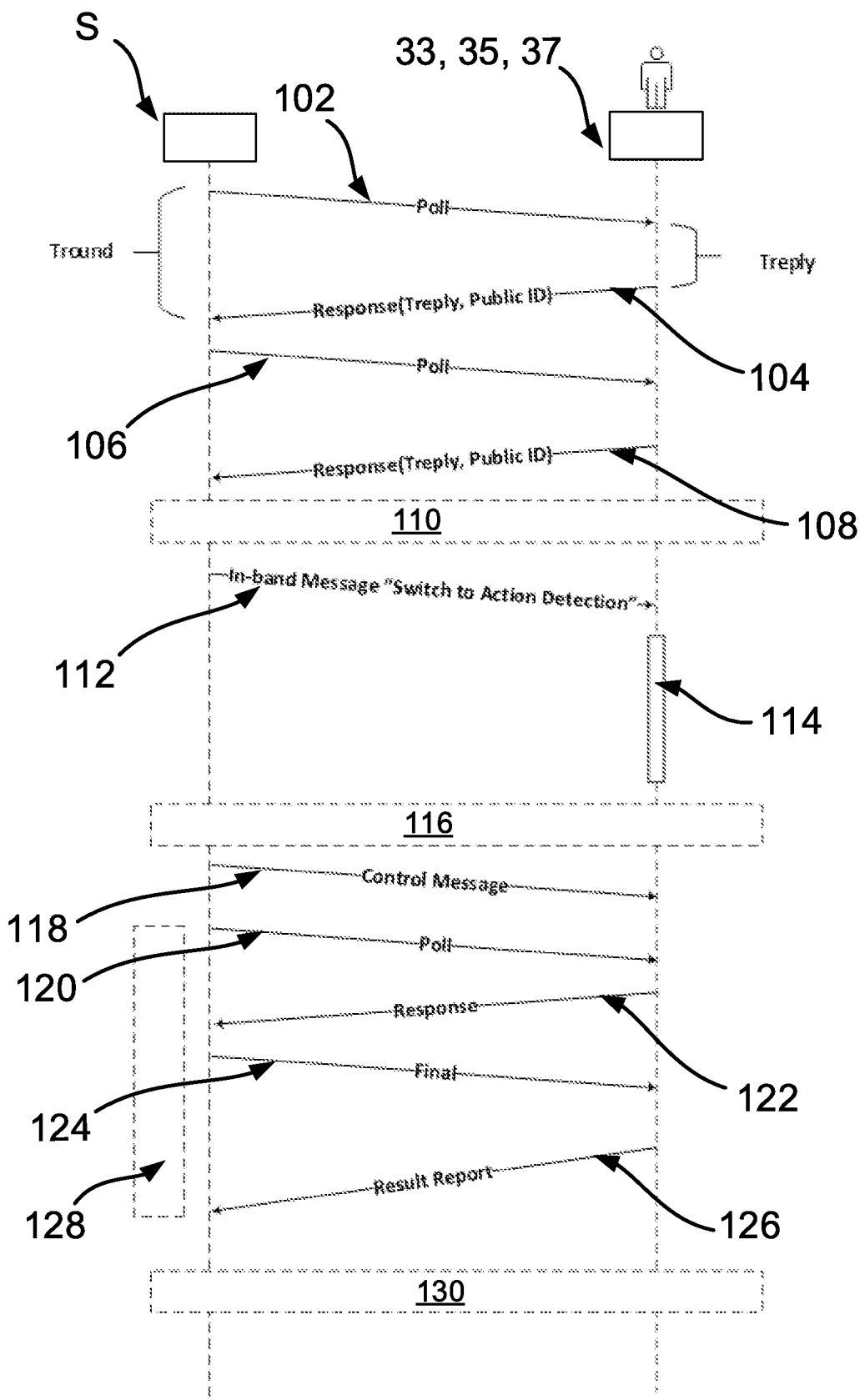
FIG. 3 shows a detection method according to another embodiment of this disclosure.

FIG. 3 shows two stages of a proximity detection and authentication method according to an embodiment of this disclosure. The first stage is substantially as described above in relation to FIG. 2, however note the in FIG. 3 it is illustrated that the first stage may include multiple polling messages 102, 106 and multiple replies 104, 108 for the mobile computing devices 33, 35, 37 as explained above. Accordingly, it is illustrated that:

Each mobile computing device 33, 35, 37 may, over time, receive and reply to more than one polling message 102, 106. This may allow the anchor S to monitor the movement of a mobile computing device 33, 35, 37 by monitoring the distance D according to any changes in Treply contained within the reply packets 104, 108 received from a given mobile computing device 33, 35, 37.

Each anchor S may poll and receive replies from more than one mobile computing device 33, 35, 37 at any given time.

A next stage of the proximity detection and authentication method may involve one of the turnstiles 20, on making a proximity determination in respect of a first of the mobile computing devices 33, 35, 37, commencing a secure authentication process to authenticate a user 32, 34, 36 carrying the first mobile computing device 33, 35, 37. The proximity determination may be performed by the anchor(s) S. The proximity determination may generally be aimed at identifying people carrying mobile computing devices who have an intent to pass through a given turnstile 20. The secure authentication process may be commenced in respect of those people and those people only, so as to reduce or avoid performing unnecessary secure authentication processes.

The proximity determination, which is denoted by box 110 in FIG. 3, may be implemented in a number of ways.

In one embodiment, the proximity determination may involve comparing the distance D (e.g. determined using the values of Treply and Tround as described above) with a threshold distance. If the distance D is shorter than the threshold distance, then the anchor S may determine that the mobile computing device 33, 35, 37 is close enough to the turnstile 20 of that anchor S to indicate that the person 32, 34, 36 carrying the mobile computing device 33, 35, 37 must intend to pass through that turnstile 20. The threshold distance may be set according to factors such as the layout of the turnstiles 20 and the environment (e.g. concourse) containing the turnstiles 20. By way of example, the threshold distance may by around 0.1-2 meters.

In one embodiment, the proximity determination may involve comparing the distance D (e.g. determined using the values of Treply and Tround as described above) as a function of time. This can allow the anchor S to determine that the mobile computing device 33, 35, 37 is moving toward the turnstile 20. This determination may be used instead of, or in conjunction with the threshold distance determination described above to determine the intention of the person 32, 34, 36 carrying the mobile computing device 33, 35, 37 to pass through the turnstile 20 of that anchor S. By way of example only, the threshold distance may be set to a larger value for mobile computing devices 33, 35, 37 that have been determined to be moving towards the anchor S of that particular turnstile 20. As such, the secure authentication process may be commenced for some mobile computing devices 33, 35, 37 even if they are currently further away than the nominal threshold distance.

When a plurality of turnstiles 20 are provided, the proximity determination may include some form of conflict resolution process, to avoid the anchor(s) S of more than one turnstile 20 commencing the secure authentication process in respect of the same mobile computing device 33, 35, 37. In one embodiment, the proximity determination may, for instance, involve determining which one of the turnstiles 20 the mobile computing device 33, 35, 37 is closest to. For instance, the anchor(s) S of each turnstile 20 may share distance information with the anchor(s) S in other turnstiles 20. An arbitration may be performed process whereby the turnstile 20 including the anchor(s) S that the mobile computing device 33, 35, 37 is closest to is allocated ownership of that mobile computing device 33, 35, 37 for the purposes of performing the secure authentication process and (assuming the mobile computing device 33, 35, 37 is authenticated in that process) allowing the person carrying that mobile computing device 33, 35, 37 to pass through the allocated turnstile 20.

When a plurality of turnstiles 20 are provided, the proximity determination may also involve using angular information to assist in determining which turnstile 20 the mobile computing device 33, 35, 37 is closest to and/or approaching. This may be implemented in a number of ways.

In a first approach, the anchor(s) S may use angle of arrival ("AoA") data sent to the anchor(s) by the mobile computing devices 33, 35, 37. In this implementation, the reply packets 104, 108 sent to the anchor(s) S by the mobile computing devices 33, 35, 37 may include the AoA data. This data may be determined by the mobile computing devices 33, 35, 37 based on the angle of arrival of the polling message(s) 102, 106 received from the anchor(s) S and then added to the reply packets 104, 108. The turnstiles may use this AoA data to determine the bearing and range of each mobile computing device 33, 35, 37, allowing a more precise proximity determination to be made. It is also envisaged that the AoA data may be updated over time, allowing the anchor(s) S to determine more accurately which turnstile 20 each mobile computing device 33, 35, 37 is moving toward.

Not all mobile computing devices may have the capability to determine the angle of arrival of messages received from the anchor(s) S. Accordingly, in another approach, the turnstiles may determine a distance of the mobile computing devices 33, 35, 37 from at least two anchors S and then use a triangulation calculation based on the distance of the mobile computing devices 33, 35, 37 from the at least two turnstiles 20 and a distance between the least two turnstiles 20.

It is envisaged that the approaches to using angular information may be combined. For instance, the AoA data approach may be used when a given mobile computing device 33, 35, 37 is capable of providing the necessary AoA data, but the turnstiles 20 may fall back on the triangulation approach in the event that it does not receive AoA data from a given mobile computing device 33, 35, 37. In another implementation, the AoA data approach may be used to verify the triangulation approach result, or vice versa.

As part of, or in addition to, the proximity determination process, the anchor S may also process the Public ID received from the mobile computing device 33, 35, 37 in the reply message or messages 104, 106. This may involve checking the Public ID against a database containing a list of public IDs. For instance, the list in the database may be an "allowed list" of mobile computing devices owned by users that are, in principle, allowed to pass through the turnstile subject to the secure authentication process in stage two of the proximity detection and authentication method to be described in more detail below. The database may be held remotely on a server such as the server 2 shown in FIG. 2. The anchor S may thus contact the server 2 via one of the communications links 41, 42, 43, 44, by sending a message including the public ID received from the mobile computing device. The server 2 may reply with a message indicating whether the public ID is present in the list held in the database.

If the reply from the server 2 indicates that the public ID of the mobile computing device is not present in the list, then the anchor S may determine not to proceed with the secure authentication process to be described below. An error message may be sent by the anchor S to the mobile computing device.

On the other hand, if the reply from the server 2 indicates that the public ID of the mobile computing device is present in the list, and assuming that the proximity determination has also been made, then the anchor may proceed with the secure authentication process described below.

The content of the reply packets 104, 108 in accordance with an embodiment of this disclosure is shown below in Table 1.

TABLE 1 content of reply packets sent to anchor(s) by mobile computing device(s).

| Field Name | Description |
| --- | --- |
| UWB Message ID | Indicate if the message is Blink, Poll, Response a or "Switch to Action detection" message 112 |
| Destination Address | Extended address of the device when the UWB message type is "Switch to Action detection" message 112 |
| Public ID | Unique ID (e.g. 64 bit) allocated for the mobile computing device |
| AoA | Angle of Arrival as detected by mobile computing device |

Once the proximity determination has been made (and the optional checking of the public ID has been performed), the anchor S may transmit an in-band message 112 to the mobile computing device 33, 35, 37 associated with the proximity determination, instructing the mobile computing device 33, 35, 37 to switch to a secure authentication process mode. On receipt of this message 112, the mobile computing device 33, 35, 37 switches to the secure authentication process mode in step 116 shown in FIG. 3. At this point, the non-secure ranging process between the anchor S and the mobile computing device 33, 35, 37 may cease. Although the anchor may continue to send (e.g. broadcast) polling messages 102, 106, and receive and process replies 104, 108 from other mobile computing devices, the mobile computing device 33, 35, 37 associated with the proximity determination may ignore the subsequent polling messages 102, 106 and not send any replies thereto. This can reduce message traffic in the overall system.

Subsequently, messages may be sent between the anchor S and the mobile computing device 33, 35, 37 for performing the secure authentication process. These messages may be sent and received using any suitable wireless communications technology. For instance, the messages may be sent and received using ultra-wide-band, "UWB", communications, or near field communications.

The protocol involved may be any secure protocol that supports a wireless secure authentication process. One such protocol comprises a Security Token Service, "STS", session, using a session key which is unique to the mobile computing device 33, 35, 37. The session key may be (or may be derived from) public ID of the mobile computing device contained in the reply or replies 104, 108. It is envisaged that the protocol may alternatively be a near field communications (NFC) protocol.

By way of illustration, FIG. 3 shows that the messages for performing the secure authentication process may in this embodiment include:

- a control message 118 sent to the mobile computing device 33, 35, 37 by the anchor S;
- a polling message 120 sent to the mobile computing device 33, 35, 37 by the anchor S;
- a response 122 sent by the mobile computing device 33, 35, 37 to the anchor S;
- a final confirmation message 124 sent to the mobile computing device 33, 35, 37 by the anchor S; and
- a result report message 126 sent by the mobile computing device 33, 35, 37 to the anchor S.

These messages are consistent with the Security Token Service protocol embodiment mentioned above. The STS session is denoted by the box 128 in FIG. 3. The control message 118 in this embodiment may instruct the mobile computing device 33, 35, 37 to commence the STS session 128.

Once the secure authentication process has been completed, the anchor S may make a determination as to whether the person 32, 24, 36 carrying the mobile computing device 33, 35, 37 has been authenticated. That is to say that the anchor may determine whether the person 32, 24, 36 carrying the mobile computing device 33, 35, 37 is permitted to pass through the turnstile 20. If the anchor S determines that the person 32, 24, 36 carrying the mobile computing device 33, 35, 37 is not permitted to pass through the turnstile 20, then the turnstile 20 may remain closed to that person 32, 24, 36. On the other hand, as illustrated in step 130 in FIG. 3, if the anchor S determines that the person 32, 24, 36 carrying the mobile computing device 33, 35, 37 is permitted to pass through the turnstile 20, then the anchor S may cause the barrier of that turnstile 20 to open, thereby clearing the walkway 23 of that turnstile 20 to allow the person 32, 24, 36 passage through the turnstile 20.

While the proximity detection and authentication method and system has largely been described above with reference to a single anchor and a single mobile computing device, it will be appreciated that multiple anchors S in adjacent turnstiles may each perform the proximity detection and authentication method in parallel with the anchors S of other turnstiles in a row of turnstiles of the kind shown in FIG. 1. Similarly, the anchor(s) of each turnstile may perform the method of FIGS. 2 and 3 with multiple mobile computing devices at any given moment. For instance, while the anchor is performing the secure authentication process with one mobile computing device, it may in parallel be performing the non-secure ranging process (including the optional public ID checking process) with one or more other mobile computing devices. The anchors may also communicate with each other to avoid multiple anchors/turnstiles attempting to perform the secure authentication process with the same mobile computing device. For instance, the public ID of any mobile computing device for which proximity detection has been completed at a first anchor may be sent to the other anchors in a row of turnstiles, to inform the other turnstiles that the anchor of the first turnstile has taken ownership of that mobile computing device for the purposes of performing the secure authentication process.

According to embodiments of this disclosure, there may be provided a computer program product comprising program instructions executable on a processor (e.g. a processor of an anchor S of the kind described above) for performing the methods described above. A computer program product according to an embodiment of this disclosure may, for instance, be stored on a carrier medium such as CD, DVD, Blu-Ray disc, memory stick, solid state memory or hard disk drive. The computer program product may be stored on an anchor S of the kind described herein.

Accordingly, there has been described a proximity detection and authentication method and system. The method includes one or more turnstiles using a non-secure ranging process to detect a proximity of one or more mobile computing devices carried by respective users. The method also includes one of the turnstiles, on making a proximity determination in respect of a first of said mobile computing devices, commencing a secure authentication process to authenticate a user carrying the first mobile computing device. The method further includes, in response to a determination that the user carrying the first mobile computing device has been authenticated, allowing the user carrying the first mobile computing device to pass through the turnstile.

Although particular embodiments of this disclosure have been described, it will be appreciated that many modifications/additions and/or substitutions may be made within the scope of the claims.

The invention claimed is:

1. A proximity detection and authentication method comprising:
   in a system comprising at least two turnstiles arranged in a row, each turnstile formed from a pair of bases with an anchor mounted on each base, using a non-secure ultra-wideband (UWB) ranging process to detect which one of the at least two turnstiles is closest to a mobile computing device, the mobile computing device using a UWB ranging message to transmit a public identifier (ID) to the closest turnstile;
   the closest one of said turnstiles, after completion of the ranging process commencing a secure UWB authentication process to authenticate a user carrying the mobile computing device; and
   in response to a determination that the user carrying the mobile computing device has been authenticated, allowing the user carrying the mobile computing device to pass through the closest turnstile.

2. The proximity detection and authentication method of claim 1, wherein detecting which one of the at least two turnstiles is closest to the mobile computing device further comprises determining that the mobile computing device is within a threshold distance from the closest turnstile.

3. The proximity detection and authentication method of claim 1, wherein detecting which one of the at least two turnstiles is closest to the mobile computing device further comprises monitoring a range of the mobile computing device from the closest turnstile over time and determining that the mobile computing device is moving toward the turnstile.

4. The proximity detection and authentication method of claim 1, wherein-the closest turnstile is determined using a time for a UWB polling message, broadcast by an anchor of one of the turnstiles, to reach the first mobile computing device, plus a time for a reply message from the first mobile computing device to reach the anchor, wherein the reply message includes a public key there are a plurality of said turnstiles.

5. The proximity detection and authentication method of claim 4, comprising determining the closest turnstile using an angle of arrival, "AoA", calculation based on AoA data included in one or more packets received from the mobile computing device.

6. The proximity detection and authentication method of claim 5, further comprising determining the closest turnstile by determining a distance of the mobile computing device from the least two turnstiles and using a triangulation calculation based on the distance of the mobile computing device from the at least two turnstiles.

7. The proximity detection and authentication method of claim 1, comprising commencing said secure authentication process to authenticate a user carrying the mobile computing device based on double-sided two way ranging and a session key that is unique to the mobile computing device.

8. The proximity detection and authentication method of claim 1, comprising:
   checking a database of public IDs for the public ID included in the one or more packets received from the mobile computing device; and
   commencing said secure authentication process in response to a determination that the public ID included in the one or more packets received from the mobile computing device is present in the database of public IDs.

9. The proximity detection and authentication method of claim 1, wherein two adjacent turnstiles of the at least two turnstiles share a base and anchor.

10. The proximity detection and authentication method of claim 1, further comprising accessing, by the closest turnstile, a database of public IDs to determine if the public identifier received from the mobile computing device is present.

11. The proximity detection and authentication method of claim 1, wherein the non-secure ranging process uses double-sided two-way ranging (DS-TWR).

12. The proximity detection and authentication method of claim 1, further comprising using a conflict resolution process to avoid anchors of multiple turnstiles from commencing the secure UWB authentication process with the mobile computing device.

13. A non-transitory computer readable medium for storing a computer program comprising program instructions executable on a processor for performing a proximity detection and authentication method comprising:
  in a system comprising at least two turnstiles arranged in a row, each turnstile formed from a pair of bases with an anchor mounted on each base, using a non-secure ultra-wideband (UWB) ranging process to detect which one of the at least two turnstiles is closest to a mobile computing device, the mobile computing device using a UWB ranging message to transmit a public identifier (ID) to the closest turnstile;
  the closest one of said turnstiles, after completion of the ranging process, commencing a secure UWB authentication process to authenticate a user carrying the mobile computing device; and
  in response to a determination that the user carrying the mobile computing device has been authenticated, allowing the user carrying the mobile computing device to pass through the closest turnstile.

14. The non-transitory computer readable medium of claim 13, for use with a plurality of said turnstiles, the proximity detection and authentication method, wherein the closest turnstile is determined using a time for a UWB polling message, broadcast by an anchor of one of the turnstiles, to reach the first mobile computing device, plus a time for a reply message from the first mobile computing device to reach the anchor, wherein the reply message includes a public key there are a plurality of said turnstiles.

15. The non-transitory computer readable medium of claim 13, wherein the proximity detection and authentication method comprises:
  commencing said secure authentication process to authenticate a user carrying the first mobile computing device based on double-sided two way ranging and a session key that is unique to the mobile computing device.

16. The non-transitory computer readable medium of claim 13, wherein the proximity detection and authentication method comprises:

checking a database of public IDs for the public ID included in the one or more packets received from the first mobile computing device; and
  commencing said secure authentication process in response to a determination that the public ID included in the one or more packets received from the first mobile computing device is present in the database of public IDs.

17. A proximity detection and authentication system comprising:
  at least two turnstiles arranged in a row, each turnstile formed from a pair of bases with an anchor mounted on each base, each anchor comprising an antenna for sending and receiving messages using ultra-wideband (UWB) for use in a non-secure ranging process to detect a proximity of one or more mobile computing devices carried by respective users, wherein the non-secure ranging process determines which one of the at least two turnstiles is closest to a mobile computing device of the one or more mobile computing devices, the mobile computing device using a UWB ranging message to transmit a public identifier (ID) to the closest turnstile;
  after making the proximity determination between the closest turnstile and the mobile computing device, an anchor of the closest turnstile commences a secure UWB authentication process to authenticate a user carrying the mobile computing device; and
  in response to a determination that the user carrying the first mobile computing device has been authenticated, allow the user carrying the mobile computing device to pass through the closest turnstile.

18. The proximity detection and authentication system of claim 17, wherein the closest turnstile is determined using a time for a UWB polling message, broadcast by an anchor of one of the turnstiles, to reach the first mobile computing device, plus a time for a reply message from the first mobile computing device to reach the anchor, wherein the reply message includes a public key there are a plurality of said turnstiles.

19. The proximity detection and authentication system of claim 17, wherein the system is operable to commence said secure authentication process to authenticate a user carrying the first mobile computing device based on double-sided two way ranging and a session key that is unique to the mobile computing device.

20. The proximity detection and authentication system of claim 19, wherein the system is operable to:
  check a database of public IDs for the public ID included in the one or more packets received from the first mobile computing device; and
  commence said secure authentication process in response to a determination that the public ID included in the one or more packets received from the mobile computing device is present in the database of public IDs.

* * * * *